(12) United States Patent
Lenkman et al.

(10) Patent No.: US 8,752,659 B1
(45) Date of Patent: Jun. 17, 2014

(54) DRIVE UNIT FOR A CARRIER

(76) Inventors: Thomas E. Lenkman, St. Charles, MO (US); David C. Massey, Kirkwood, MO (US)

( * ) Notice: Subject to any disclaimer, the term of this patent is extended or adjusted under 35 U.S.C. 154(b) by 0 days.

(21) Appl. No.: 13/341,508

(22) Filed: Dec. 30, 2011

(51) Int. Cl.
*B60K 1/00* (2006.01)

(52) U.S. Cl.
USPC ..... 180/65.1; 180/65.51; 180/19.1; 180/19.3; 180/24.02

(58) Field of Classification Search
USPC .................. 180/65.1, 65.5, 19.1, 19.3, 24.02
See application file for complete search history.

(56) References Cited

U.S. PATENT DOCUMENTS

| | | | |
|---|---|---|---|
| 3,304,116 A | 2/1967 | Stryker | |
| 4,475,611 A * | 10/1984 | Fisher | 180/6.5 |
| 5,348,326 A | 9/1994 | Fullenkamp et al. | |
| 5,584,085 A * | 12/1996 | Banko | 5/710 |
| 5,987,671 A | 11/1999 | Heimbrock et al. | |
| 6,256,812 B1 | 7/2001 | Bartow et al. | |
| 6,588,523 B2 | 7/2003 | Heimbrock et al. | |
| 6,752,224 B2 | 6/2004 | Hopper et al. | |
| 6,772,850 B1 | 8/2004 | Waters et al. | |
| 6,902,019 B2 | 6/2005 | Heimbrock et al. | |
| 6,993,799 B2 | 2/2006 | Foster et al. | |
| 7,007,765 B2 | 3/2006 | Waters et al. | |
| 7,011,172 B2 | 3/2006 | Heimbrock et al. | |
| 7,090,041 B2 | 8/2006 | Vogel et al. | |
| 7,191,854 B2 | 3/2007 | Lenkman | |
| 7,273,115 B2 | 9/2007 | Kummer et al. | |
| 7,284,626 B2 | 10/2007 | Heimbrock et al. | |
| 7,407,024 B2 | 8/2008 | Vogel et al. | |
| 7,644,458 B2 | 1/2010 | Foster et al. | |
| 7,828,092 B2 | 11/2010 | Vogel et al. | |
| 2007/0245488 A1 | 10/2007 | Zimbalista et al. | |
| 2011/0087416 A1 | 4/2011 | Patmore | |

* cited by examiner

*Primary Examiner* — Joseph M Rocca
*Assistant Examiner* — Marlon Arce
(74) *Attorney, Agent, or Firm* — Grace J. Fishel (57) ABSTRACT

A drive unit for a carrier that includes a chassis with a drive wheel that is pivotable with an air spring in and out of contact with a surface over which the carrier is propelled. The air spring is in a pneumatic system including an air compressor which is connected to a processor in an electrical system. The compressor is programmed to provide a fair safe mode for the drive wheel, a runtime control for the air compressor and a battery voltage sensing circuit to shut down the electrical system during periods of inactivity.

10 Claims, 7 Drawing Sheets

DRIVE UNIT FOR A CARRIER

BACKGROUND OF THE INVENTION

1. Field of the Invention

The present invention relates to a drive unit for a carrier for patient handling devices and medical equipment. The drive unit has a processor programmed to control operation of the unit. Included features are a fail safe mode for unintended loss of power, a runtime control to prevent overheating of an air compressor and a battery charge sensor such that the unit is shut down during periods of inactivity.

2. Brief Description of the Prior Art

Health care facilities utilize a wide variety of patient handling and equipment moving carriers. Examples of such carriers include beds, gurneys, stretchers, wheelchairs, bed chairs and other types of devices that are designed to help support a patient. Other carriers are used to transport medical equipment such as scanners and the like. In some prior art carriers such as described in U.S. Pat. No. 7,191,854 to Lenkman, the carrier includes a chassis having casters at each corner and a drive unit with a wheel that is pivotable with an air spring in and out of contact with a surface over which the carrier is propelled. A processor controls the active status of an independent motor control system for rotating the wheel and the operation of an air compressor for inflating the air spring. Areas for improvement include, if there is a leak in the pneumatic system the compressor may overheat and if there is an unintended interruption in power, the drive wheel may lose traction with the support surface. Additionally, during period of inactivity, such as if the unit is accidentally left on, battery charge may be wasted.

BRIEF SUMMARY OF THE INVENTION

In view of the above, it is an object of the present invention to provide a drive unit with a system for preventing compressor overheating. It is another object to provide a drive unit with a fail safe mechanism for maintaining drive wheel traction in the event of unintended power interruption. It is also an object to provide a drive unit including a system for conserving battery charge during periods of inactivity. Other objects and features of the invention will be in part apparent and in part pointed out hereinafter.

In accordance with the invention, a drive unit for propelling a carrier across a supporting surface wherein the carrier has a chassis mounted on casters. The drive unit includes a drive wheel connected to an electric motor for rotating the wheel with the drive wheel mounted for rotation on a pivot arm attached to the chassis. The pivot arm is resiliently biased by an extension spring such that the drive wheel is out of contact with the supporting surface.

An air spring is provided for counterbalancing the extension spring and biasing the drive wheel into contact with the supporting surface. The air spring is connected to an air compressor in a pneumatic system including a normally closed air relief valve under control of a processor.

The processor may be programmed with one or more of the features:

(1) The processor is in electrical circuit with a battery power source and an on/off switch and programmed to send a signal opening the normally closed air relief valve when the switch is moved from on to off position.

(2) The processor is programmed to provide runtime control of the compressor such that the compressor does not exceed a duty cycle for which the compressor is rated.

(3) The processor is programmed to open the electric circuit shutting down the unit when the electric motor for the drive wheel has not been operated for a predetermined period of time.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Referring to the drawings more particularly by reference character, reference numeral 10 refers to a drive unit in association with a pneumatic system 12 (FIG. 1) under control of an electrical system 14 (FIG. 2) including a processor 16. Drive unit 10 is mounted in a chassis 18 of a carrier 20 as shown in FIG. 3. For purposes of clarity, the nature of the load carried on carrier 20 has been omitted but may include patient handling devices such as a bed, gurney, stretcher, wheelchair, bed chair or the like or for moving equipment such as a scanner or the like. Suitable attachments and modifications of chassis 18 depend on the nature of the load. Chassis 18 is mounted on casters 22, one pair at a front 24 of the carrier and a second pair at a rear 26 of the carrier. In the form illustrated, chassis 18 includes first and second frames 28 and 30, respectively, connected with a pivot joint 32 and a pair of minor image drive units 10.

Figure 1:
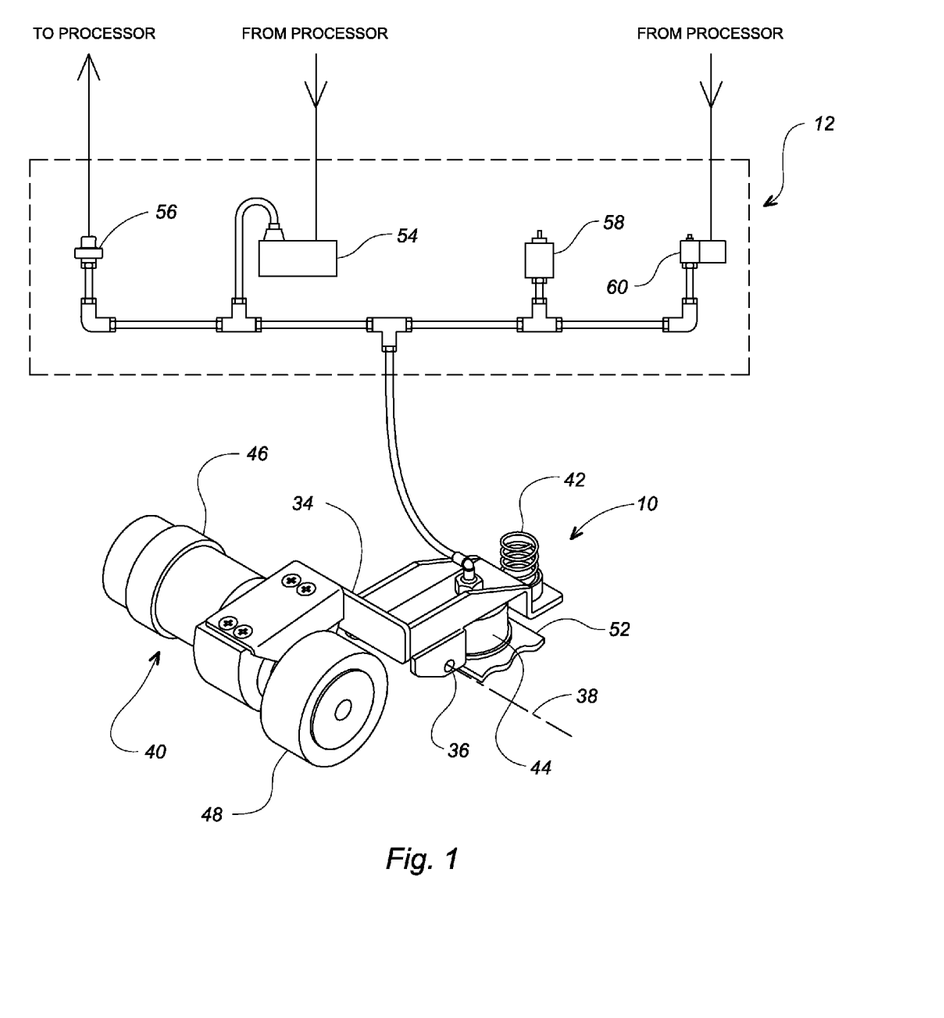
FIG. 1 is a perspective view of a drive unit in association with a schematic diagram of a pneumatic system.

As shown in FIG. 1, each drive unit 10 includes a pivot arm 34. Pivot arm 34 has first and second ends and a shaft hole 36 through which a pivot axle 38 passes. Pivot axle 38 is attached to chassis 18 and is the fulcrum about which the weight of a drive wheel assembly 40 on first end of pivot arm 34 is balanced by a compression spring 42 and air spring 44 on second end of pivot arm 34. Drive wheel assembly 40 includes a motor 46 under an independent motor control system for rotating a drive wheel 48. Compression spring 42 is seated between second end of pivot arm 34 and chassis 18 and causes pivot arm 34 to rotate about pivot axle 38 lifting drive wheel 48 out of contact with a support surface 50 over which carrier 20 may be passed. The resistance of compression spring 42 may be overcome by inflating air spring 44 which applies at upward force against second end of pivot arm 34 forcing drive wheel 48 into contact with support surface 50. As illustrated, air spring 44 is seated on a bracket 52 attached to chassis 18.

Pneumatic system 12 includes an air compressor 54 under control of processor 16 in electrical system 14 as more particularly described below. Air compressor 54 is flowably connected to air spring 44. A pressure switch 56, air bleed valve 58 and a normally closed air exhaust solenoid 60 are included in pneumatic system 12. When pressure switch 56 senses that the pressure in pneumatic system is a below a predetermined value, for example 80 psi, it signals processor 16 which causes air compressor 54 to pressurize pneumatic system 12 to a preset maximum. Air bleed valve 58 opens to exhaust excess air if the pressure in pneumatic system 12 raises about a preset maximum. Normally closed air exhaust solenoid 60 opens under control of processor 16 when the unit is turned off. If there is an unintended interruption in power, normally closed exhaust solenoid 60 maintains pressure in pneumatic system 12 and in air spring 44. This maintains traction of drive wheel 48 against support surface 50 and may prevent runaway of carrier 20 as for example down a ramp.

Figure 2:
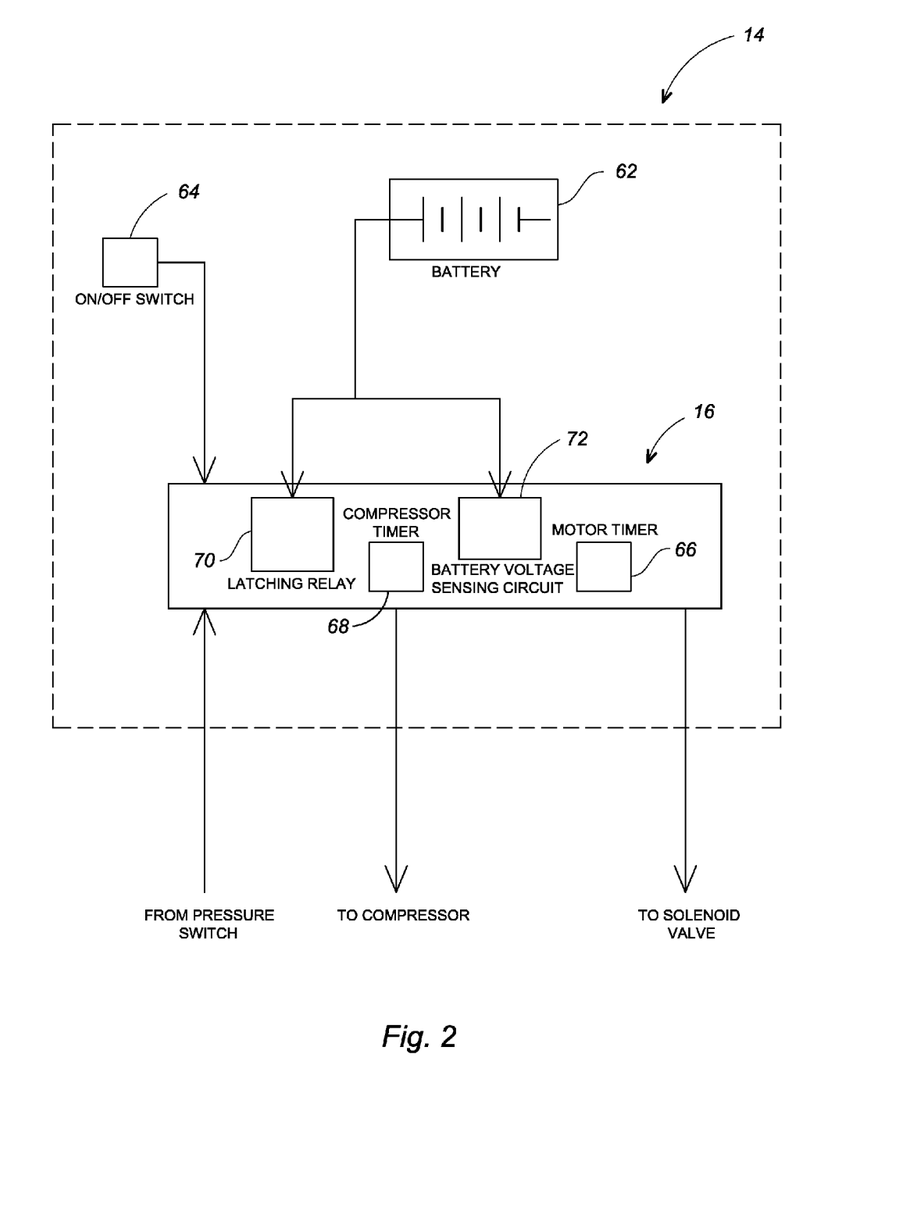
FIG. 2 is a schematic diagram of an electrical system.
Figure 3:
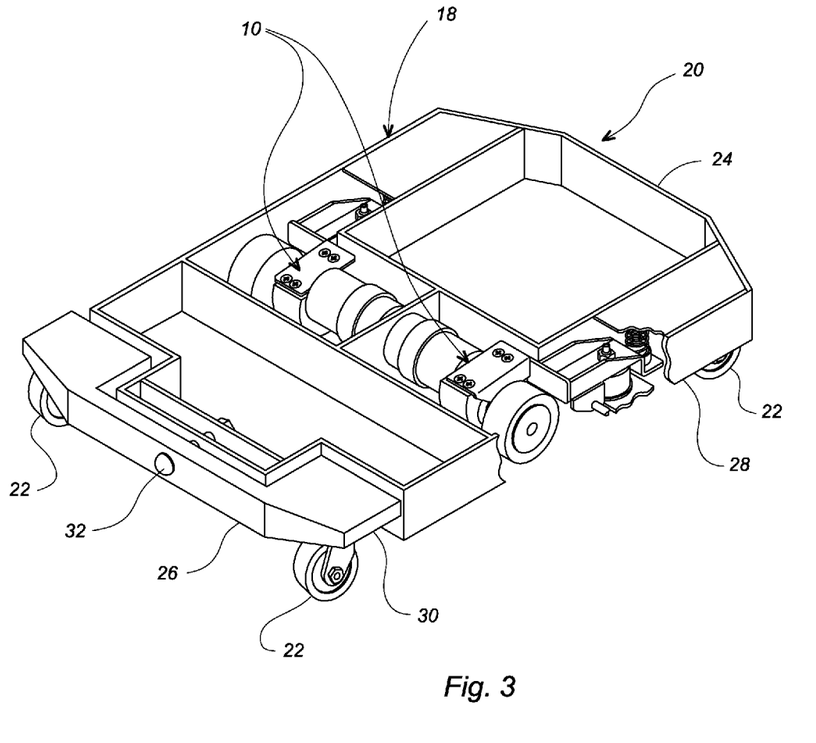
FIG. 3 is a perspective view of the chassis of a carrier with a pair of drive units.

As shown in FIG. 2, electrical system 14 includes processor 16, pressure switch 56 (FIG. 1), normally closed solenoid valve 60 (FIG. 1), a battery 62 and an on/off switch 64. Processor 16 includes one or more logic boards with a motor timer 66, a compressor timer 68, a latching relay 70 connected to the battery, and a battery voltage sensing circuit 72 and is programmed with algorithms to control pneumatic system 12 and the independent motor control system as follows.

After a normal shutdown of electrical system 14, latching relay 70 connected to battery 62 is opened. When On/off switch 64 is moved to on position, latching relay 70 closes and the system begins to function. Upon receipt of a signal from on/off switch 64 that the unit is being turned off, a signal is sent to normally closed solenoid 60 which opens an air valve for a fixed period of time determined to be sufficient to totally depressurize the system. The drive wheel 48 is thus retracted by compression spring 42. If the unit is connected to an external power source for the purpose of recharging battery 62, an external power circuit inhibits operation of the drive unit 10 by passing a signal to the motor drive control which inhibits operation of motor 46.

Figure 8:
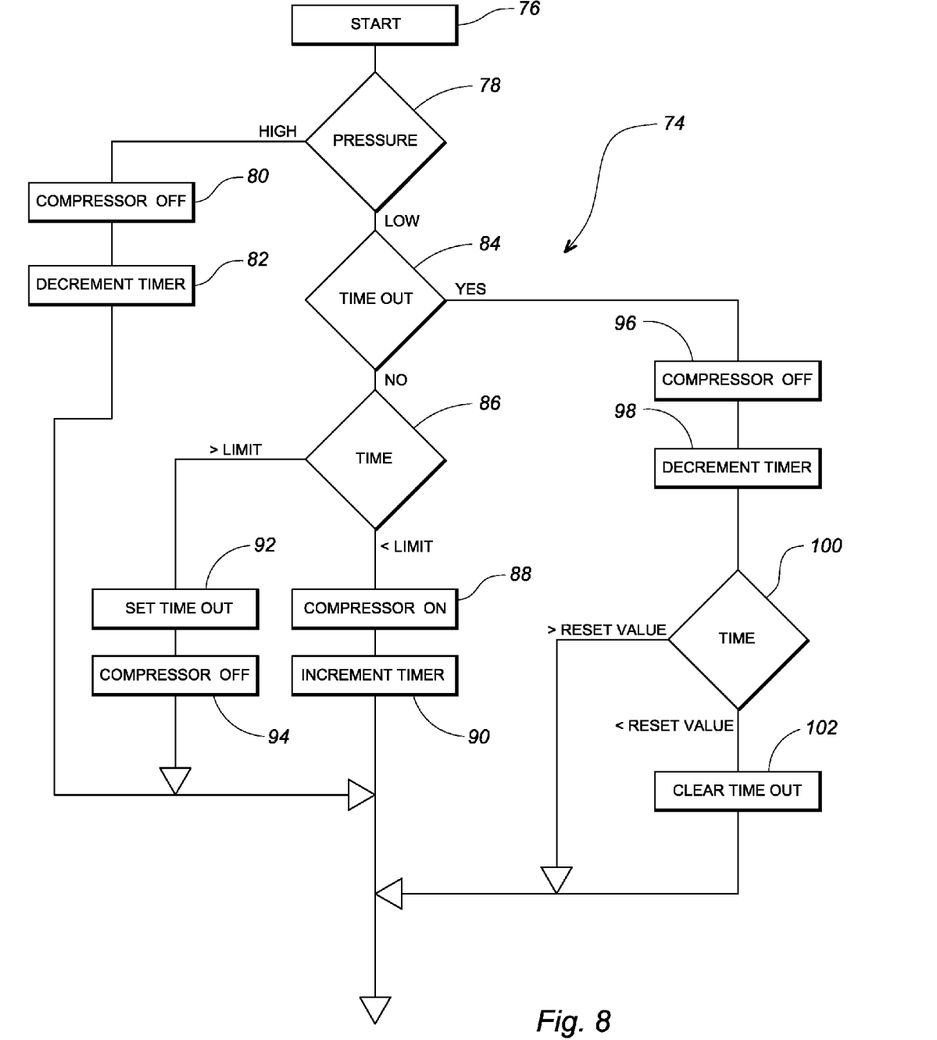
FIG. 8 is a block logic diagram for runtime control of an air compressor in the pneumatic system; and, FIG. 9 is a block logic diagram for evaluating changes in the battery charge voltage in the electrical system during periods of air compressor inactivity.

FIG. 8 is a logic diagram of a decision program to limit runtime for air compressor 54. Since pneumatic system 12 has a small volume and the pressures required to inflate air spring 44 are moderate, compressor 54 may be relatively small. For example, the Gast 30R with a 20% duty cycle is adequate. But because compressor 54 is small, it could overheat if run continuously, for example if there was a leak in pneumatic system 12. When compressor 54 runs, a signal is sent to compressor timer 68 in processor 16 which keeps track of the period of time that compressor 54 has been run in a duty cycle. Compressor timer 68 also keeps track of the period of time that compressor 54 has been off between duty cycles. The decision program as described below prevents damage to the compressor because of excessive run times and duty cycles.

With continuing reference to FIG. 8, a compressor control system 74 comprises an algorithm executed in processor 16 which begins operation at step 76 when a power on/off switch is actuated. At decision block 78, a signal is sent by pressure switch 56 to processor 16. If processor 16 senses that pressure is high, processor 16 switches compressor 54 off at step 80 and at 82 decrements compressor timer 68 if not already at zero. After decrementing timer 68, the operation returns to start 76 to begin again on a predetermined periodic basis such as once a second or some other value.

At decision block 78, if processor 16 senses the pressure is low, the block diagram advances to timeout decision block 84. Timeout is a state variable which is used to control operation of compressor 54 such that it does not run more frequently than it can be safely operated without damaging the compressor. If the timeout state variable has not been set, the system proceeds to decision block 86. If compression timer 68 has accumulated a runtime less than a preselected value, compressor 54 is permitted to run in step 88 and compressor timer 68 is incremented in step 90. If compressor timer 68 has a accumulated a runtime more than a preselected limit, timeout state variable is set in step 92 and compressor 54 turned off in step 94.

If at decision block 84, the timeout state variable has been set, compressor 54 is turned off in step 96 and compressor timer 68 is decremented in step 98. At decision block 100 a predetermined reset value determines how soon compressor 54 may be restarted after a duty cycle. If the compressor timer 68 value has not decremented sufficiently (i.e., the time the compressor should cool between uses) and the value is greater than the predetermined reset value, the timeout state variable remains set. When the time measured by compressor timer 68 is greater than the timeout period, the timeout state variable is cleared in step 102 which will allow the compressor 54 to run if the pressure is low beginning at start 76.

Figure 9:
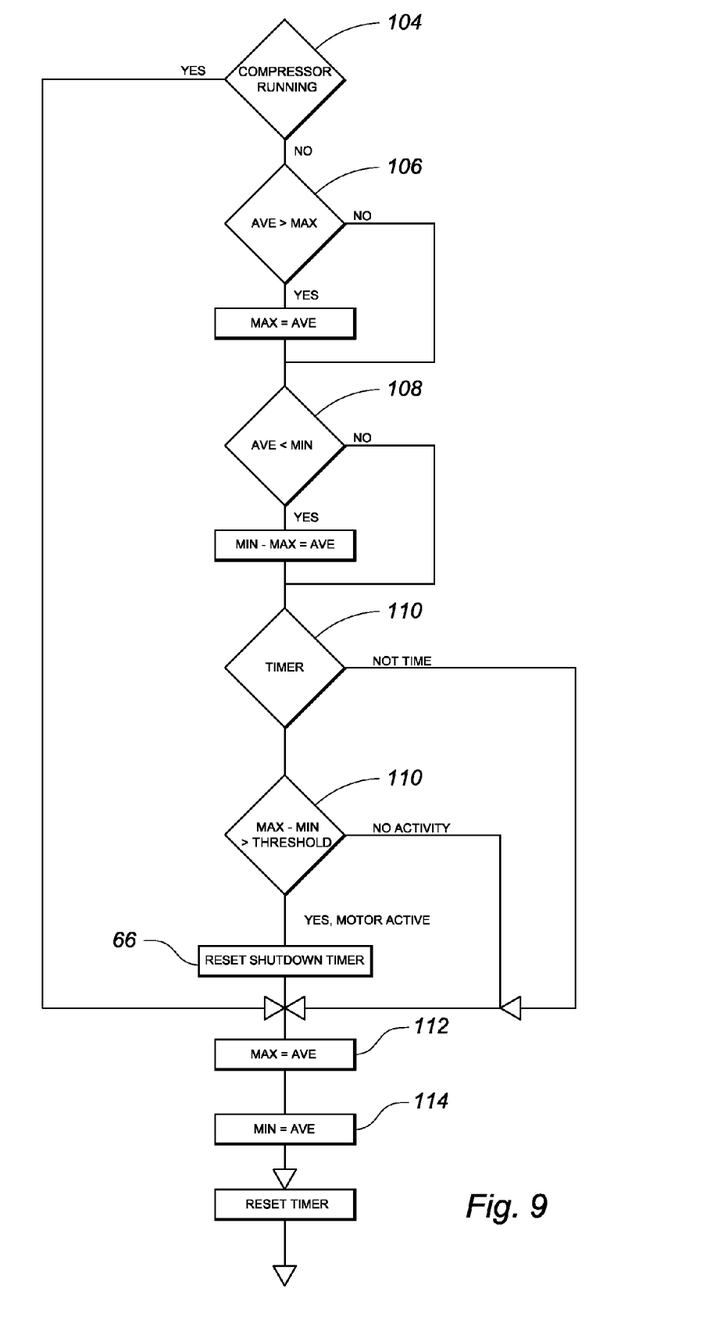

FIG. 9 is a logic diagram describing the operation of battery voltage sensing circuit 72 to determine the activity status of motor 46 based on the influence the motor current has on the battery voltage. The purpose of the program is to avoid unnecessary discharge of battery 62 during long periods of nonuse inferred from inactivity of motor 46 operating drive wheel 48. The system shown in FIG. 9 determines the activity status of motor 46 based on the influence the motor current has on the battery voltage. The system has the ability to ignore other known loads on battery 62 that do not constitute activity of motor 46. Since processor 16 controls air compressor 54, processor 16 can ignore changes in voltage during periods when the compressor is in use. The algorithm provides a means to conserve battery charge if a user leaves carrier 20 unattended for prolonged periods of time. If motor 46 is running, the battery voltage will change. The system thus looks for characteristic changes in voltage as a result of the use of motor 46. An absence of fluctuations indicates inactivity.

At decision block 104, processor 16 senses whether compressor 54 is running. If not, the block diagram advances to decision block 106, if the voltage is above a predetermined stored maximum, the voltage is stored as the maximum. In decision block 108, if the voltage is below a predetermined stored minimum, the voltage is stored as the minimum. In decision block 110, the difference between the maximum voltage and the minimum voltage is determined after a sample period, for example 1 minute. If the difference between the maximum and minimum voltage is above a predetermined threshold value, motor 46 must be active and a reset shutdown time is reset. On the other hand, if the difference is not above the threshold value, motor 46 must not be in use. In either case, the maximum voltage and the minimum voltage become are reset to the current average values in decision blocks 112 and 114. Sampling continues and if the difference on an iteration does not rise above the threshold value within the period of the reset shutdown timer, a signal by processor 16 turning the system off. On the other hand, if the difference is above the threshold value, motor timer 66 is reset. Since sampling of the maximum voltage and minimum voltage is done continuously and evaluation of the difference between the minimum and maximum voltages is performed periodically, for example once a minute, long term changes in battery voltage as a result of temperature or battery discharge are compensated for. The length of the time window in decision block 110, the length of the time in motor timer 66 and the threshold value may be optimized based on user requirements, drive motor load and battery characteristics.

Figure 4:
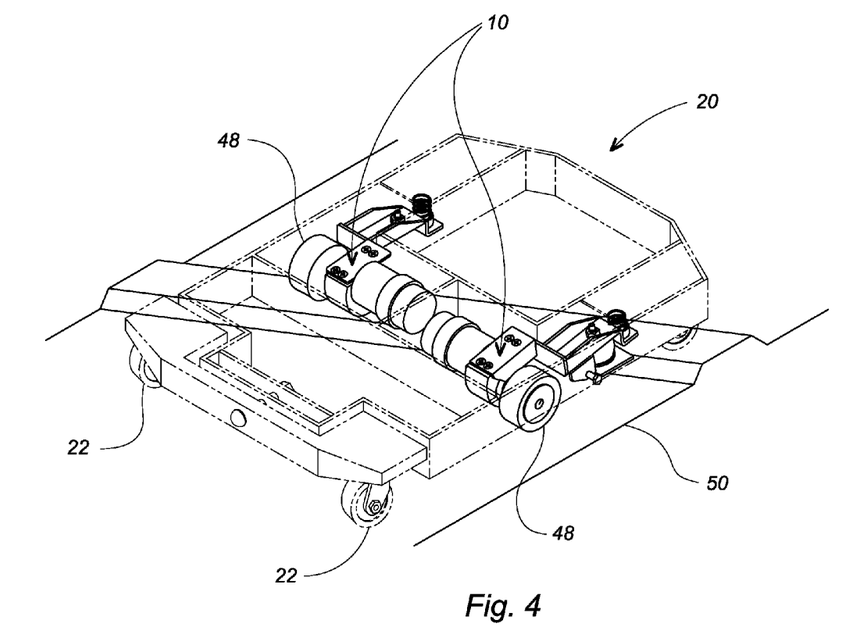
FIG. 4 is an X-ray view of the chassis showing the drive units passing over an angled floor surface.
Figure 5:
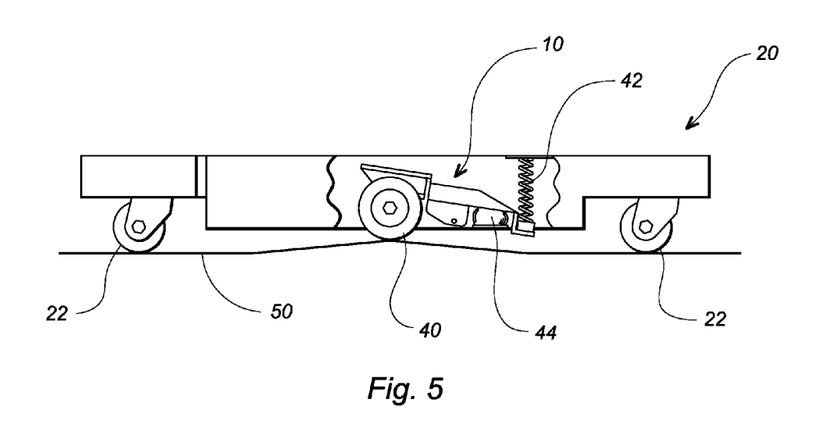
FIG. 5 is a side elevation of the carrier, partially broken away to show the drive unit passing over a bump in the floor surface.
Figure 6:
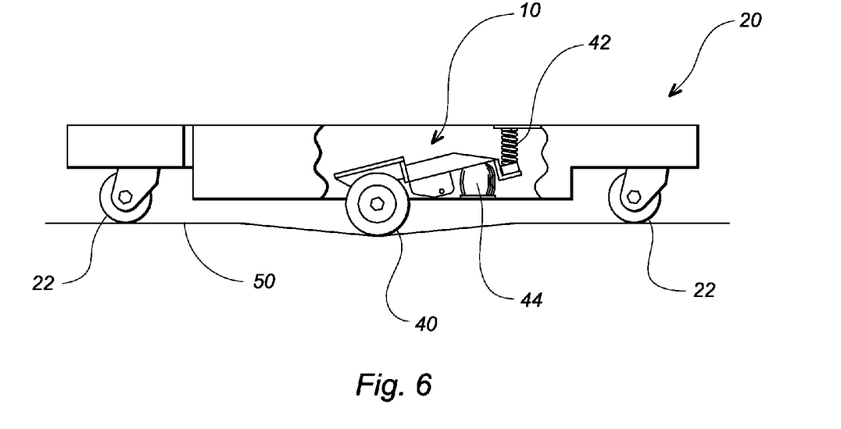
FIG. 6 is a side elevation of the carrier, partially broken away to show the drive unit passing over a dip in the floor surface.
Figure 7:
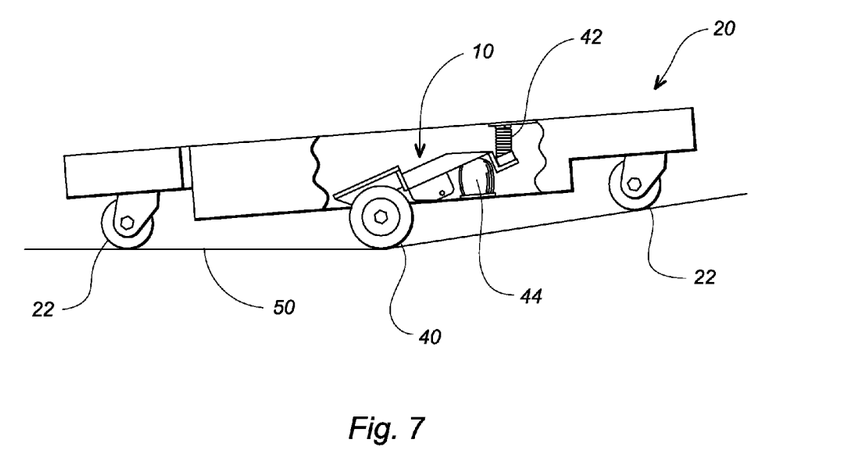
FIG. 7 is a side elevation of the carrier, partially broken away to show the drive unit starting up a ramp.

In use, carrier 20 may be moved under its own power with drive unit 10 while independent motor control system gives the operator control over the speed and direction of travel. When a pair of drive units 10 are provided and drive wheels 48 operated in opposite directions, it is possible to make a very tight turn with carrier 20. Paired drive units 10 as shown in FIG. 4 also allow carrier 20 to easily manuever over an angled support surface 50. As shown in FIG. 5, if drive wheel 48 of drive unit 10 travels over a bump, drive wheel 48 is forced upward, increasing the pressure on air spring 44 and in pneumatic system 12. If the pressure exceeds a predetermined maximum, air bleed valve 58 opens and casters 22 remain in contact with support surface 50. On the other hand, if drive wheel 48 travels over a depression as shown in FIG. 6 or up a ramp as shown in FIG. 7, traction on drive wheel 48 is maintained by pumping more air into pneumatic system 12, which need is sensed by pressure switch 56.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A drive unit for propelling a carrier across a supporting surface, said carrier having a chassis on casters, said drive unit comprising
    a drive wheel connected to an electric motor for rotating the wheel,
    said drive wheel mounted for rotation on a pivot arm attached to the chassis,
    said pivot arm resiliently biased by an extension spring such that the drive wheel is out of contact with the supporting surface,
    an air spring for counterbalancing the extension spring and biasing the drive wheel into contact with the supporting surface,
    said air spring connected to an air compressor in a pneumatic system,
    said air compressor in an electrical system with a battery power source and a processor,
    said processor having a logic board with a compressor timer programmed with a compressor timer to provide runtime control of the compressor, said compressor timer keeping track of period of time the compressor has run in a duty cycle and the period of time that the compressor has been off between duty cycles.

2. The drive unit of claim 1 wherein the pneumatic system includes a pressure switch which sends a signal to the processor if the pressure in the pneumatic system falls below a predetermined pressure, said processor starting the air compressor in response to said signal to bring the pressure in the pneumatic system back to the predetermined pressure under control of the compressor timer.

3. A drive unit for propelling a carrier across a supporting surface, said carrier having a chassis on casters, said drive unit comprising
    a drive wheel connected to an electric motor for rotating the wheel,
    said drive wheel mounted for rotation on a pivot arm attached to the chassis,
    said pivot arm resiliently biased by an extension spring such that the drive wheel is out of contact with the supporting surface,
    an air spring for counterbalancing the extension spring and biasing the drive wheel into contact with the supporting surface,
    said air spring connected to an air compressor in a pneumatic system,
    said air compressor in an electrical system with the electric motor for the drive wheel, a battery power source and a processor,
    said processor including a logic board with a compressor timer programmed to provide run time control of the compressor and programmed with a motor timer to open the electrical system shutting down the unit when the electric motor for the drive wheel has not operated for a predetermined period of time.

4. The drive unit of claim 3 wherein the a voltage sensor is connected to the battery, said processor programmed to set the motor timer to open the electrical system when the compressor is not running and no voltage change is sensed above a threshold level in predetermined period of time.

5. The drive unit of claim 3 wherein a pair of minor image drive units are provided on the carrier, the electric motor of each drive wheel under independent motor control through the processor.

6. A carrier with a chassis on casters and a pair of mirror image drive units for propelling the carrier across a supporting surface, each of said drive units comprising:
    a drive wheel connected to an electric motor for rotating the wheel,
    said drive wheel mounted for rotation on a pivot arm attached to the chassis,
    said pivot arm resiliently biased by an extension spring such that the drive wheel is out of contact with the supporting surface,
    an air spring for counterbalancing the extension spring and biasing the drive wheel into contact with the supporting surface,
    said air spring connected to an air compressor in a pneumatic system including a normally closed air relief valve under control of a processor,
    said processor in a battery powered electrical system with an on/off switch, said processor having a logic board programmed with a compressor timer to provide runtime control of the compressor and to send a signal opening the normally closed air relief valve when the switch is moved from on to off position, said compressor timer keeping track of period of time the compressor has run in a duty cycle and the period of time that the compressor has been off between duty cycles,
    said processor further programmed to open the electrical system shutting down the unit when the electric motors for the drive wheel have not operated for a predetermined period of time.

7. The carrier of claim 6 wherein the normally closed relief valve remains closed if there is an unintended loss of power in the electrical system thereby maintaining pressure in the pneumatic system and the traction of the drive wheel against the supporting surface.

8. The drive unit of claim 6 wherein the pneumatic system includes a pressure switch which sends a signal to the processor if the pressure in the pneumatic system falls below a predetermined pressure, said processor starting the air compressor in response to said signal to bring the pressure in the pneumatic system back to the predetermined pressure under control of the compressor timer.

9. The drive unit of claim 6 wherein the processor includes a logic board with a motor timer.

10. The drive unit of claim 9 wherein the a voltage sensor is connected to the battery, said processor programmed to set the motor timer to open the electrical system when the compressor is not running and no voltage change is sensed above a threshold level in predetermined period of time.

* * * * *